United States Patent [19]
Kokubu et al.

[11] Patent Number: 5,883,304
[45] Date of Patent: Mar. 16, 1999

[54] APPARATUS FOR MEASURING AND CORRECTING UNIFORMITY OF TIRES

[75] Inventors: Takao Kokubu, Akishima; Takahiro Goto; Kazuhide Kinoshita, both of Kodaira; Katsutoshi Nakashima, Hachioji; Masaharu Oku, Kodaira, all of Japan

[73] Assignee: Bridgestone Corporation, Tokyo, Japan

[21] Appl. No.: 906,901

[22] Filed: Aug. 6, 1997

[30] Foreign Application Priority Data

| Aug. 9, 1996 | [JP] | Japan | 8-211173 |
| Aug. 9, 1996 | [JP] | Japan | 8-211174 |
| Dec. 25, 1996 | [JP] | Japan | 8-345353 |
| Jun. 20, 1997 | [JP] | Japan | 9-164344 |

[51] Int. Cl.$^6$ .................................................. G01M 17/02
[52] U.S. Cl. ........................................................ 73/146
[58] Field of Search .......................... 73/8, 146; 364/506, 364/507, 508, 552

[56] References Cited

U.S. PATENT DOCUMENTS

| 3,604,245 | 9/1971 | Atelian | 73/146 |
| 3,726,124 | 4/1973 | Obarski | 73/146 |
| 3,910,109 | 10/1975 | Paulovsky et al. | 73/146 |
| 4,846,334 | 7/1989 | Cargould | 72/146 |
| 5,229,954 | 7/1993 | Beebe | 364/508 |

FOREIGN PATENT DOCUMENTS

| 53-14598 | 5/1978 | Japan . |
| 6254989 | 9/1994 | Japan . |

Primary Examiner—William Oen
Attorney, Agent, or Firm—Sughrue, Mion, Zinn, Macpeak & Seas, PLLC

[57] ABSTRACT

A tire uniformity measurement and correction apparatus capable of carrying out measurement and correction of tire uniformity efficiently without causing stagnation of a transfer line due to correction of the tire uniformity is provided.

The apparatus comprises right and left transfer conveyors arranged in two parallel files for transferring tires; rim shafts provided at each corresponding middle position of the right and left transfer conveyors for supporting and rotating the tire by upper and lower rims; a rotary drum arranged between the right and left rim shafts capable of moving in a right and left direction to be pressed against the tire supported by one of the rim shafts for detecting load condition while rotating together with the tire; grinder mechanism provided on each of the right and left transfer conveyors at a position opposite to the rotary drum with respect to the transfer conveyor; and control means for controlling uniformity measurement by the rotary drum and uniformity correction by the grinder mechanism so that when the uniformity correction of a tire supported by one of the rim shafts is carried out, the uniformity measurement of another tire supported by another rim shaft is carried out.

12 Claims, 16 Drawing Sheets

F I G. 4
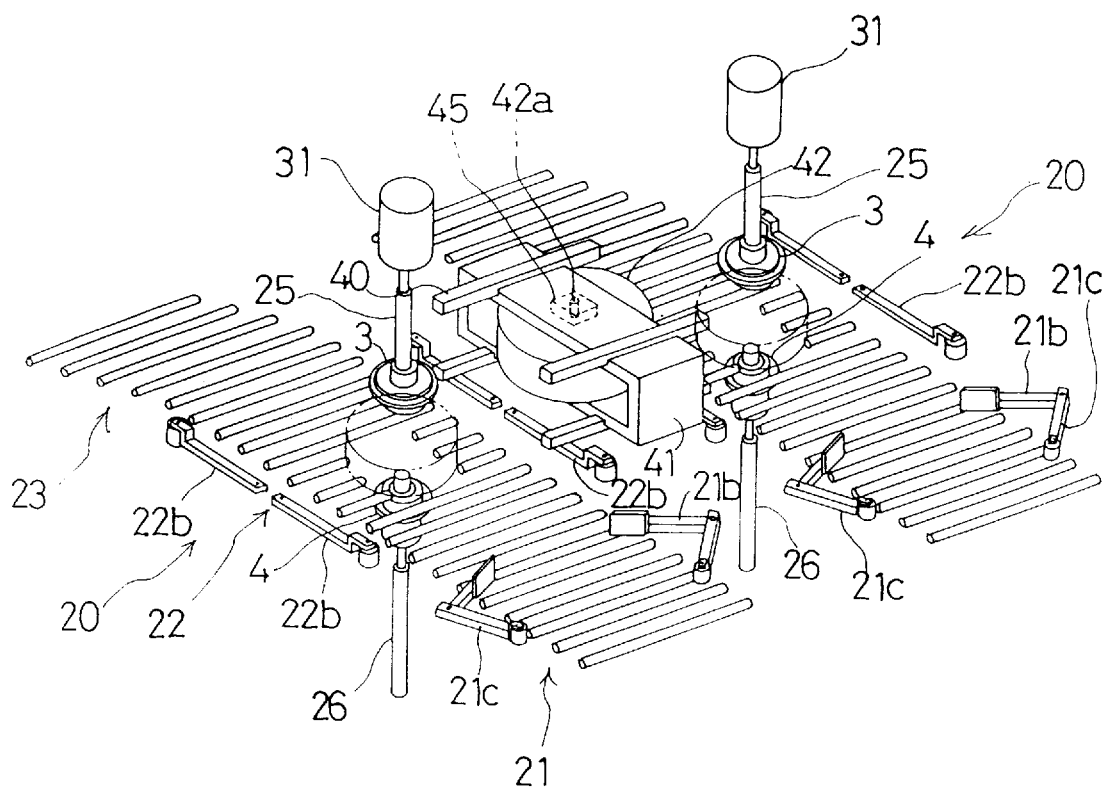

F I G. 5
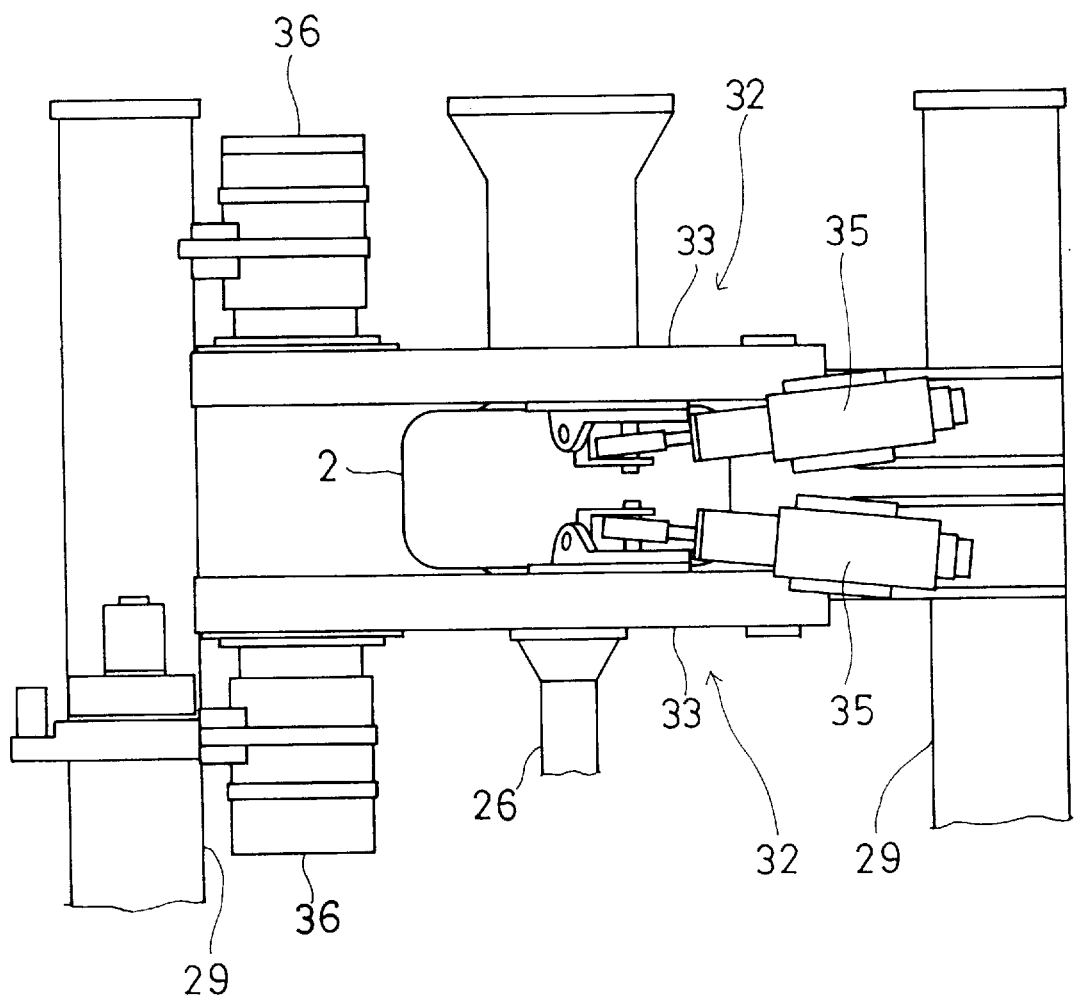

APPARATUS FOR MEASURING AND CORRECTING UNIFORMITY OF TIRES

BACKGROUND OF THE INVENTION

The present invention relates to a tire uniformity measurement and correction apparatus for measuring uniformity of tires and correcting the uniformity by a grinder mechanism if necessary.

In a uniformity measurement and correction apparatus for tire, a rotary drum used as substitute for a flat road surface is pressed against a tire attached to a rotary shaft, three components of a force occurring when the tire rotates are measured, and a uniformity correction is carried out by scraping a required portion with a grinder mechanism on the basis of the result of the measurement.

The uniformity correction is carried out while the rotary drum is pressed against the tire to carry out a uniformity measurement again after the correction and further carry out a uniformity correction if necessary.

Hitherto, one rotary drum and one grinder mechanism have been provided in combination for one transfer line in general (Japanese Patent Publication Sho 53-14598).

There is an example in which one rotary drum is used in common for two transfer lines, however, when it enters into tire uniformity correction stage, control of uniformity measurement and correction is the same as the case having one rotary drum for one transfer line.

Therefore, if a uniformity correction is commenced at one transfer line, the rotary drum is kept in the state pressed against the corresponding tire to carry out a uniformity measurement again after the correction and the state of the rotary drum pressed against the tire is maintained until an final uniformity measurement is completed after necessary repetition of corrections and measurements during which uniformity measurements are carried out intermittently.

Accordingly, another transfer line becomes stagnant with no uniformity measurement carried out and working efficiency is very low.

To cope with this, respective rotary drums may be provided on each of the two transfer lines so that uniformity measurements of the two transfer lines are carried out independently. However, installation cost increases because two rotary drums are required.

The aforementioned rotary shaft for the tire is provided on a halfway position of the transfer line to support the tire by upper and lower rims and the rotary drum is positioned on lateral of the rotary shaft.

Sizes of the upper and lower rims for supporting the tire on the rotary shaft varies in accordance with kind of the tire, therefore exchange of the rims must be carried out as occasion demands. A method for supplying the rims is proposed by Japanese Laid-Open Patent Publication No. Hei 6-254989. According to this method, a plurality of mount conveyors arranged up and down like shelf stairs and enabled to go up and down are positioned along a transfer conveyor. On each of the mount conveyors are placed a pair of upper and lower rims of different sizes.

By setting a mount conveyor having required upper and lower rims placed thereon at the same height as the transfer conveyor, the required upper and lower rims can be shifted onto the transfer conveyor easily. Thus a pair of upper and lower rims of required size can be supplied selectively.

However, in the above Japanese Hei 6-254989, there is no description about recovery of the rim after use and it follows that the recovery is carried out by handwork. Namely, taking out the upper and lower rims detached from the rotary shaft and carrying the rims in a predetermined place or one of the above mount conveyors for storage are performed by workers with a large labor force.

Further, since each one rim supply apparatus is required for one tire uniformity machine, installation cost is increased.

Tires measured by a tire uniformity measurement apparatus are classified based on the result of the measurement to be used for various purposes. In a conventional tire transport and classification apparatus, tires after uniformity measurement are transported forward by a forward transport conveyor and transferred on a right-and-left transport conveyor at an end of the forward transport conveyor, then transported by the right-and-left transport conveyor to respective positions predetermined corresponding to kinds of the tire and taken out at the corresponding positions.

A number of kinds of tire into which the tires can be classified is generally determined by that how many tires can be arranged on the right-and-left transport conveyor leaving a space between them. For example, if three tires can be arranged on the right-and-left transport conveyor leaving a proper space between them, three kinds of tire can be classified, and hitherto such classification of about three kinds was general in view of installation space.

Tire measurement standards and tire performance judgment criterions set in a tire uniformity measurement apparatus has been dispersed widely according to tire size (rim diameter, tire width, flatness etc.), use and destination and kinds of tire tend to increase more and more in the future.

The classification of about three kinds of the customary transport classification apparatus can not cope with the above situation. If the right-and-left transport conveyor is made long, the number of kinds of tire into which the tires can be classified is increased, but a broader space is required for installing the apparatus so that space efficiency becomes low. In almost all lines of existing uniformity measurement apparatuses, there is no space for the increase and such a increase is very difficult.

The present invention has been accomplished in view of the foregoing, and an object of the present invention is to provide an apparatus for measuring and correcting uniformity of tires in which a transfer line does not stagnate because of uniformity correction of a tire and uniformity measurement and correction of tires can be carried out efficiently.

Another object of the present invention is to provide a rim exchange apparatus for the tire uniformity measurement and correction apparatus in which used upper and lower rims are returned to a original supply place automatically for recovering as well as new rims are supplied to the tire uniformity measurement place from the supply place, thereby full automation is possible and reduction of installation cost can be intended.

Further object of the present invention is to provide a tire transport and classification apparatus for the tire uniformity measurement and correction apparatus in which a number of kinds of tire into which the tires can be classified can be increased greatly with a small installation space.

SUMMARY OF THE INVENTION

In order to attain the above object, the present invention provides an apparatus for measuring and correcting uniformity of tires, comprising right and left transfer conveyors arranged in two parallel files for transferring tires; rim shafts provided at each corresponding middle position of the right and left transfer conveyors for supporting and rotating the tire by upper and lower rims; a rotary drum arranged between the right and left rim shafts capable of moving in a right and left direction to be pressed against the tire supported by one of the rim shafts for detecting load condition while rotating together with the tire; grinder mechanism provided on each of the right and left transfer conveyors at a position opposite to the rotary drum with respect to the transfer conveyor; and control means for controlling uniformity measurement by the rotary drum and uniformity correction by the grinder mechanism so that when the uniformity correction of a tire supported by one of the rim shafts is carried out, the uniformity measurement of another tire supported by another rim shaft is carried out.

Since when the uniformity correction of a tire supported by one of the rim shafts is carried out, the uniformity measurement of another tire supported by another rim shaft is carried out, even if only one rotary drum is provided, there is no fear that the uniformity measurement on one of the transfer conveyors stagnates and the uniformity measurement and correction works can be carried out efficiently.

In the above invention, the control means may carry out the controlling so that the rotary drum reciprocates between the two files of transfer conveyors at a constant timing for carrying out the uniformity measurement on both transfer conveyors alternately, regardless whether the uniformity correction is necessary or not.

According to this apparatus, even if a uniformity correction is required on one of the transfer conveyors, uniformity measurements on another transfer conveyor are carried out at an ordinary pace without a loss time. The results of the uniformity correction can be measured when the rotary drum returns to the corresponding transfer conveyor.

The tire uniformity measurement and correction apparatus may be provided with a rim exchange apparatus comprising an up-and-down rim storage shelf arranged at an upper stream side of and along the transfer conveyor, having shelf stairs for storing respective pairs of upper and lower rims; a table lifter arranged at an lower stream side of and along the transfer conveyor; a rim transport means arranged between the up-and-down rim storage shelf and the table lifter; an upper stream side shifting means for shifting the pair of upper and lower rims from the up-and-down rim storage shelf to the transfer conveyor; and a lower stream side shifting means for shifting the pair of upper and lower rims from the transfer conveyor to the table lifter.

Each pair of upper and lower rims placed on the shelf stairs of the up-and-down rim storage shelf has a size different from each other. The up-and-down rim storage shelf ascends and descends to set a shelf stair having required rims at the same height as the transfer conveyor and the required rims are shifted from the shelf stair onto the transfer conveyor by the upper stream side shifting means to be used for a uniformity measurement. A pair of upper and lower rims detached from the rotary shaft for rim exchange is transferred by the transfer conveyor to the neighborhood of the table lifter, shifted onto the table lifter by the lower stream side shifting means and lowered. Then, the pair of upper and lower rims is transported by the transport means to the up-and-down rim storage shelf and placed on a predetermined shelf stair of the up-and-down rim storage shelf set at a predetermined height. Thus, supply of the upper and lower rims to the tire uniformity and correction apparatus and recovery of the used rims to the original supply place can be full automated.

Further, the tire uniformity measurement and correction apparatus may be provided with a tire transport and classification apparatus comprising right and left forward transport conveyors arranged on extensions of the right and left transfer conveyors for transporting tires after uniformity measurement; at least one intermediate forward transport conveyor arranged between the right and left forward transport conveyors for transporting the tires forward, a right-and-left transport conveyor arranged at right angles to the forward transport conveyors for transporting the tires right and left; and forward-and-rearward distribution means arranged at right and left take-out ends of the right-and-left transport conveyor respectively for distributing the tires selectively in front and rear.

In addition to classifications by each of the forward transport conveyors, four more classifications can be realized by the forward-and-rearward distribution means at right and left take-out ends of the right-and-left transport conveyor each distributing the tires selectively in front and rear.

Only by providing the forward-and-rearward distribution means at the both ends of the right-and-left transport conveyor, a number of kinds of tire into which the tires can be classified can be increased greatly without widening the installation space so much.

BRIEF DESCRIPTION OF THE DRAWINGS

FIG. 4 is a partly omitted perspective view of the measurement block;

FIG. 5 is a side view showing a grinder mechanism;

DETAILED DESCRIPTION OF THE PREFERRED EMBODIMENT

Hereinafter, a preferred embodiment of the present invention will be described with reference to FIGS. 1 to 8.

Figure 1:
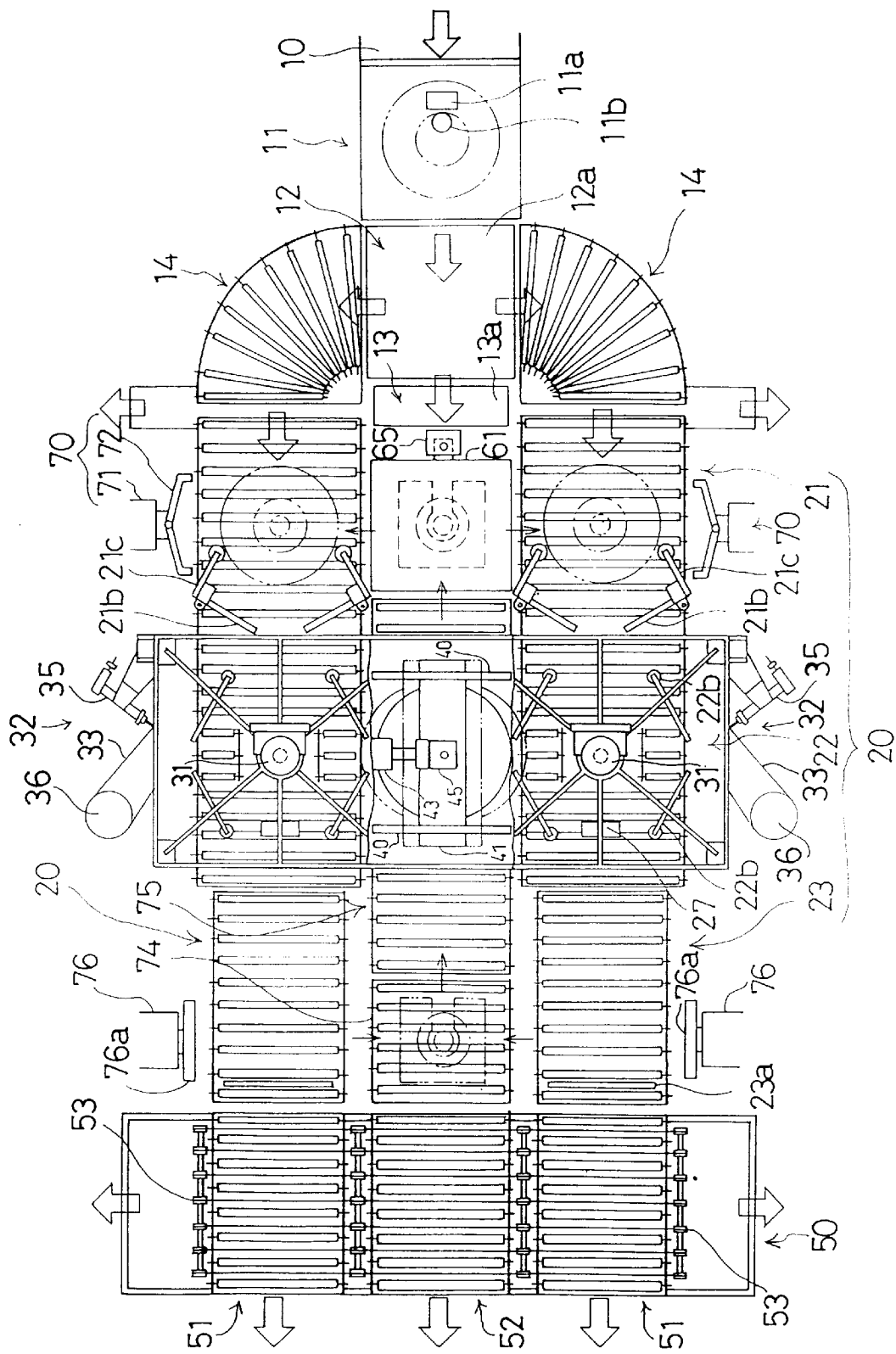
FIG. 1 is a partly omitted plan view of a tire uniformity measurement and correction apparatus according to an embodiment of the present invention.

FIG. 1 is a partly omitted plan view of a tire uniformity measurement and correction apparatus 1 according to an embodiment of the present invention. Tires 2 to be measured are brought in, one by one, to a tire discrimination apparatus 11 from a stock conveyor 10 at an upper stream end.

At the tire discrimination apparatus 11, the tire 2 is rotated about a vertical axis while a bar code discrimination paper affixed on a side wall of the tire is read by a bar code reader 11a to input information of the tire.

At the same time, a diluted silicone is applied on a bead section of the tire by a lubricant applicator 11b to ensure a smooth fitting of the tire and a rim.

On the lower stream side of the tire discrimination apparatus 11 is arranged a distribution apparatus 12 which has a slanting plate 12a capable of slanting rightward, leftward and forward for allowing the tire 2 placed on the slanting plate 12a being distributed in any of the three directions.

When two kinds of tires are scheduled to be measured, the tires are distributed in right or left side based on the tire information inputted at the tire discrimination apparatus 11 and in case that the bar code cannot be read or a not scheduled tire is brought in, the tire is distributed forward.

When only the same kind of tires is to be measured, the tires are distributed rightward and leftward alternately, except that a tire having a bar code unable to be read or a not scheduled tire is distributed forward.

The tires distributed forward fall onto a slanting plate 13a through a fall opening 13. The slanting plate 13a slants rightward or leftward so that the tire having a bar code unable to be read rolls out to one side and the not scheduled tire rolls out to another side.

The tires distributed rightward and leftward from the distribution apparatus 12 are transferred to any one of right and left transfer conveyors 20, 20 arranged in two parallel files, through roller conveyors 14, 14 curved so as to change advancing direction at a right angle.

The right and left transfer conveyors 20, 20 are constructed symmetrically with each other forming a predetermined long space between them. A part of a rim exchange apparatus is arranged in the long space.

Since the right and left transfer conveyors 20, 20 are symmetrical, one of them will be described.

The transfer conveyor 20 has a centering block 21, a measurement block 22 and a transport block 23 in order from the upper stream side. These three blocks are constituted by roller conveyors.

Figure 2:
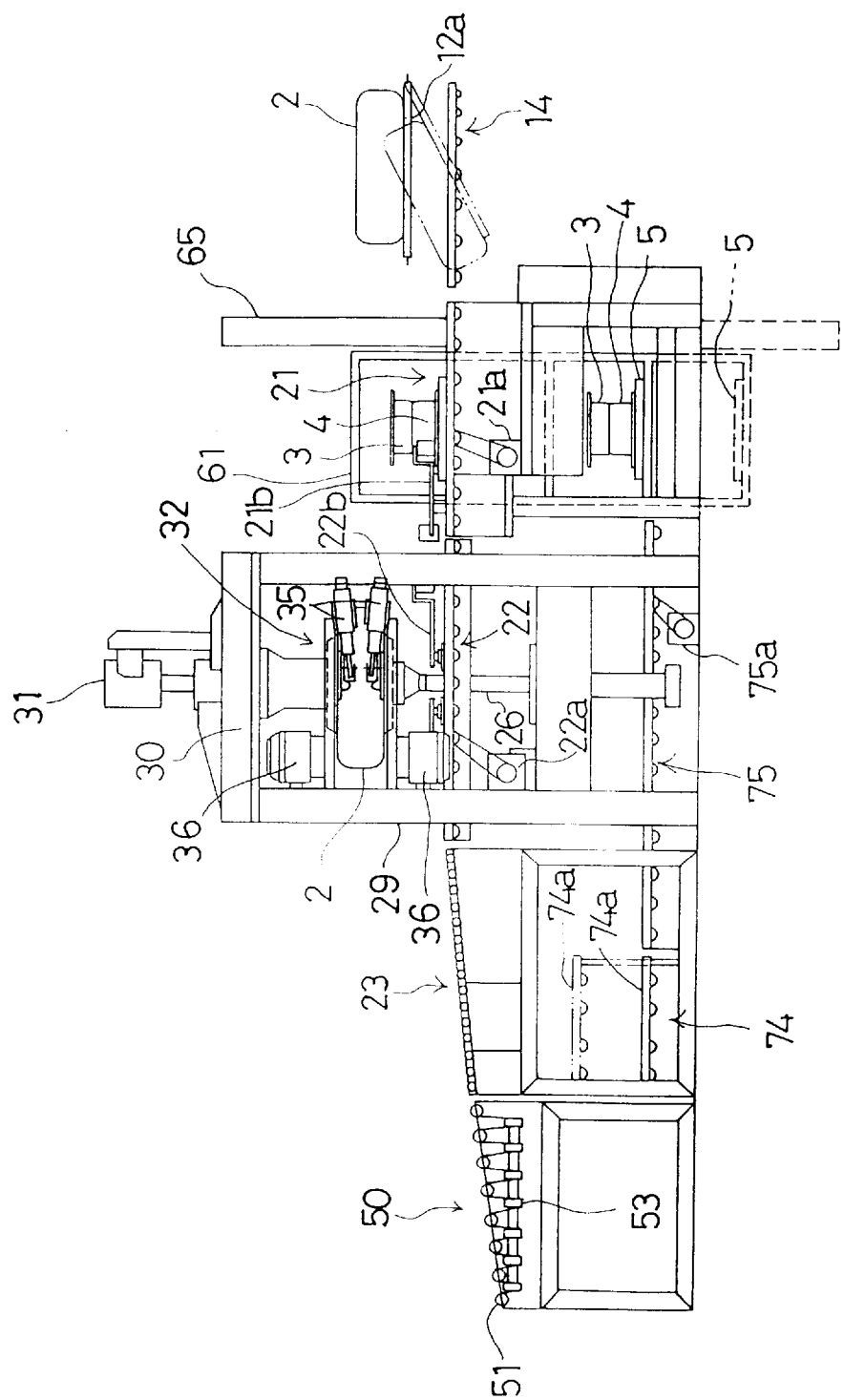
FIG. 2 is a side view thereof.

As shown in FIGS. 1 and 2, the centering block 21 has a plurality of transfer rollers turned by a motor 21a at equal speeds and a pair of right and left stoppers 21b, 21b and centering arms 21c, 21c provided so as to swing. The tire 2 brought onto the centering block 21 is stopped by the stoppers 21b, 21b and centered by the centering arms 21c, 21c holding the tire from right and left to be positioned so as to advance thereafter through a predetermined central position.

The next measurement block has a plurality of rollers turned by a motor 22a at equal speeds. These rollers can be turned in a reverse direction as well as a normal direction, namely the tire can be conveyed toward upper stream side too.

On this measurement block 22 are arranged respective pair of right and left positioning arms 22b, 22b at front and rear predetermined positions so as to swing and the tire is positioned by these four positioning arms 22b.

When the tire 2 is positioned on the measurement block 22 in such manner, the center axis of the tire 2 directed vertically aligns with upper and lower rim shafts 25, 26.

Some rollers of the measurement block 22 which are arranged at a portion supporting the positioned tire 2 are each divided into right and left short rollers to form an opening opposite to a central part of the tire.

Above the opening is hung an upper rim shaft 25 with an upper rim 3 detachably attached to the lower end. A lower rim shaft 4 is detachably attached to an upper end of a lower rim shaft 26 positioned under the upper rim shaft 25.

The lower rim shaft 26 is capable of going up and down, and the lower rim 4 attached to the upper end of the shaft 26 can pass through the opening formed by the short rollers up and down.

Figure 3:
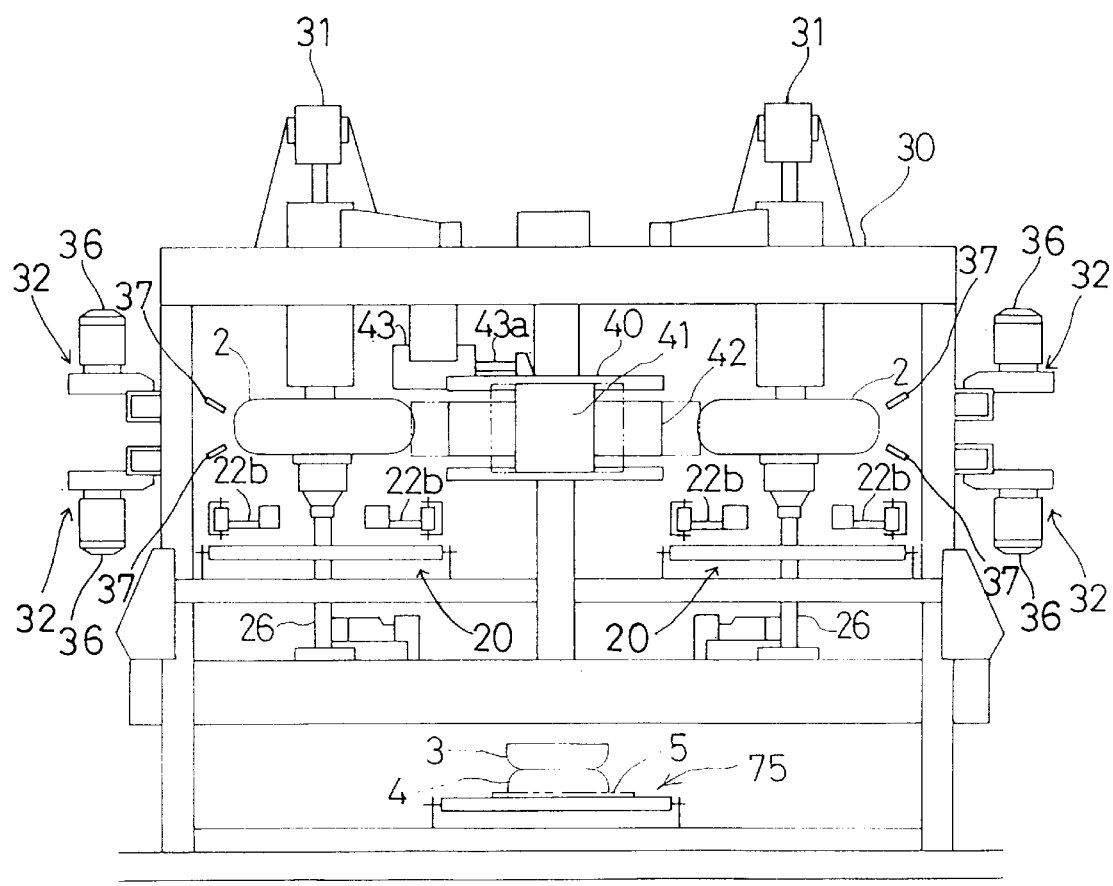
FIG. 3 is a front view of a measurement block viewed from a lower stream side.

On the one hand, the upper rim shaft 25 is pivotally supported on a supporting frame 30 constructed over the right and left measurement blocks 22, 22 and to an upper protruded portion of the shaft 25 is connected a driving shaft of a servomotor 31 (FIGS. 2 and 3).

The servomotor 31 is supported fixedly by means of a bracket on the supporting frame 30 spanned between struts 29.

Under a central part of the supporting frame 30 is arranged a rectangular frame body 41 as a holding member which can slide right and left guided by four rails 40 directed in right and left direction horizontally and provided at front, rear, upper and lower positions respectively. On the rectangular frame body 41 is pivoted a rotary drum 42 by a vertical supporting shaft 42a.

As shown in FIG. 4, the rectangular frame body 41 has upper, lower, front and rear walls to form a rectangular shape with openings on right and left sides. The supporting shaft 42a is supported by the upper and lower walls and the rotary drum is pivotally supported partly protruding out of the right and left openings.

At a lateral of the upper wall of the rectangular frame body 41 are provided a hydraulic cylinder 43 hung from the supporting frame 30 (FIG. 3). A tip end of a piston rod 43a of the hydraulic cylinder 43 is fixed to a wall of the rectangular frame member 41 so that the rectangular frame body 41 slides right and left together with the rotary drum 42 in accordance with expansion and contraction of the piston rod 43a.

The upper and lower walls of the rectangular frame body 41 are supported by the front and rear walls and have sufficient rigidity and strength for pivoting the rotary drum 42.

A load cell 45 is provided at a bearing part of the shaft 42a for detecting magnitude of variation of a force in a radial direction of the tire (radial force variation; RFV) and magnitude of variation of a force in a lateral (axial) direction of the tire (lateral force variation; LFV).

At a predetermined position above the roller conveyor of the measurement block 22 is hung a marking apparatus 27.

In addition, on one side of the measurement block 22 opposite to the rotary drum with respect to the roller conveyor are provided a pair of upper and lower grinder mechanisms 32 symmetrically.

Figure 6:
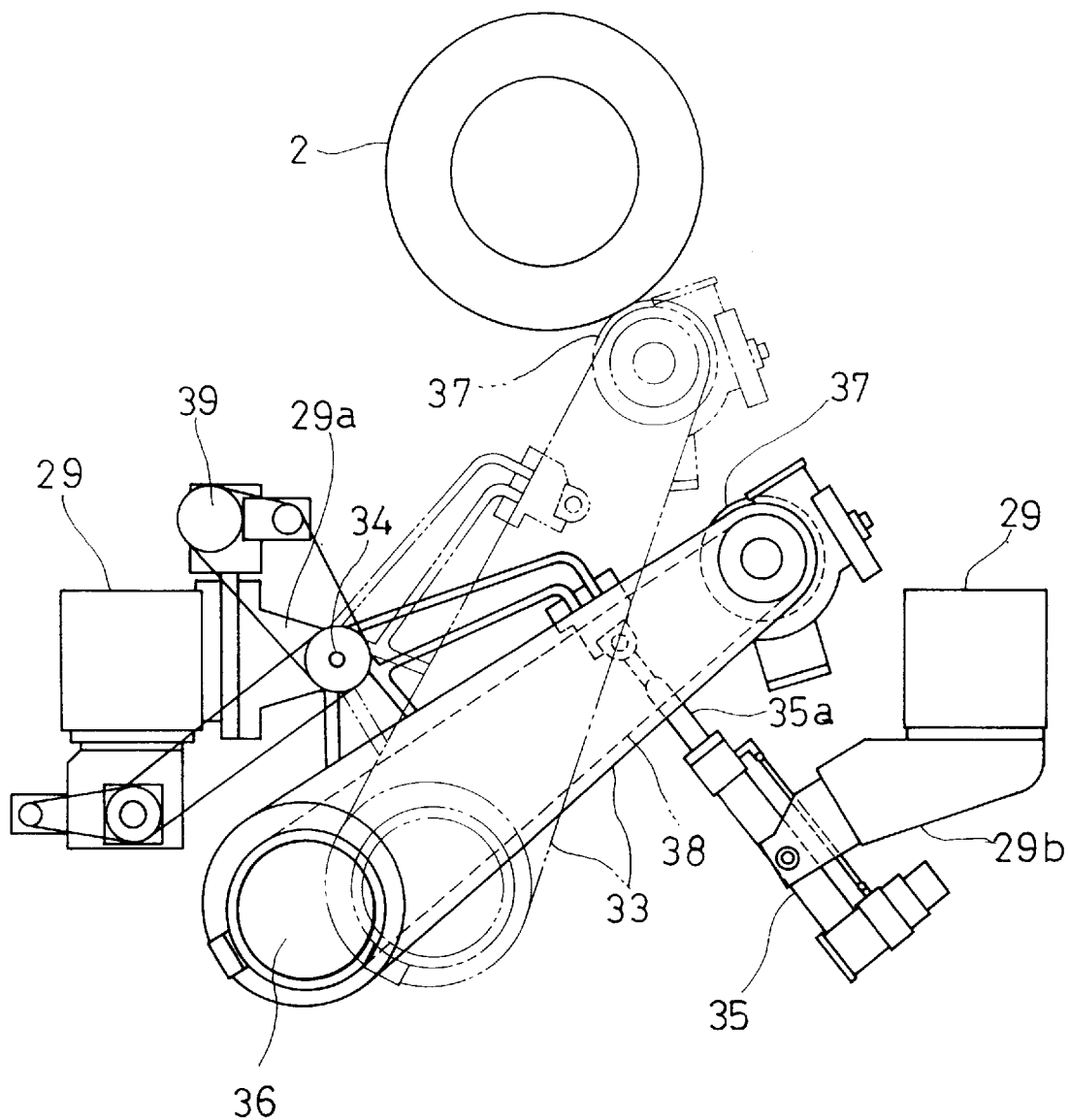
FIG. 6 is a plan view thereof.

Referring to FIGS. 5 and 6, the upper grinder mechanism 32 will be described. A swinging member 33 is supported by a bracket 29a projected from the strut 29 of the lower stream side so as to swing horizontally through a supporting shaft 34. A servo-cylinder 35 is pivoted to a bracket 29b of another strut 29 on the upper stream side and a tip end of a piston rod 35a of the cylinder 35 is pivoted to the swinging member 33 so that the swinging member is swung by driving of the servo-cylinder 35.

The swinging member 33 has a motor 36 provided on a base end side and a grinder 37 pivoted on a tip end side. A chain 38 is wound round a sprocket fitted to a driving shaft of the motor 36 and a sprocket integral with the grinder 37 so that the grinder 37 is driven by the motor 36.

In addition, the swinging member 33 is driven by a motor 39 so as to go up and down to some extent together with the grinder driving mechanism for adjusting vertical position of the grinder 37.

Therefore, the grinder 37 can be set at a position of a required height with respect to the tire 2 rotating while supported in a horizontal posture by the upper and lower rims 3, 4. Then, the rotating grinder 37 is contacted with a required part of the tire 2 by swinging the swinging member 33 with the servo-cylinder 35 to cut the part for uniformity correction.

The upper grinder mechanism 32 carries out the uniformity correction on an upper half of the tire 2 laid horizontally and the lower grinding mechanism 32 provided symmetrically with the upper grinder mechanism carries out the uniformity correction on a lower half of the tire 2.

The pair of upper and lower grinder mechanisms 32 are provided on each of the right and left transfer lines.

The transport block 23 provided next to the measurement block 22 in the transfer conveyor 20 is an inclined roller conveyor on which the tire 2 is conveyed by its own weight. A stopper 23a capable of appearing and disappearing is provided at a predetermined position near the lower stream end.

At the lower stream side of the aforementioned transfer conveyor 20, a distribution conveyor 50 is arranged and extends widthwise long so as to be connected with both the right and left transfer conveyors 20, 20. The distribution conveyor 50 is composed of roller conveyors 51, 51 corresponding to extensions of the right and left transfer conveyors 20, 20 and a roller conveyor 52 placed between the roller conveyors 51, 51. These three conveyors 51, 51, 52 the tire 2 toward the ling the tire 2 toward the lower stream side by its own weight.

A rope conveyor 53 is constituted by a plurality of ropes extending in right and left direction between respective rollers of the roller conveyors 51, 52, 51 and capable of rising and falling so as to appear and disappear.

If the rope conveyor 53 is in a fallen state, the tire 2 conveyed onto the roller conveyor 51 from the transfer conveyor 20 successively advances on the roller conveyor 51 linearly to be taken out. However, if the rope conveyor 51 rises at a suitable timing, the tire 2 comes to be supported by the rope conveyor, therefore the tire can be moved right and left by rotation of the rope conveyor 53.

After the tire was moved suitably, the rope conveyor 53 is lowered, thus the tire is transferred on any one of the roller conveyors 52, 51 to be taken out by the roller conveyor.

By moving the tire 2 on the rope conveyor 53 toward right or left beyond an end of the rope conveyor, the tire can be taken out rightward or leftward.

Therefore, at the distribution conveyor 50, the tire 2 can be distributed and taken out into any one of five places as shown in FIG. 1 by arrows. Namely, the distribution conveyor 50 constitutes a tire transport and classification apparatus for classifying tires according to their kinds as well as transporting them.

Figure 14:
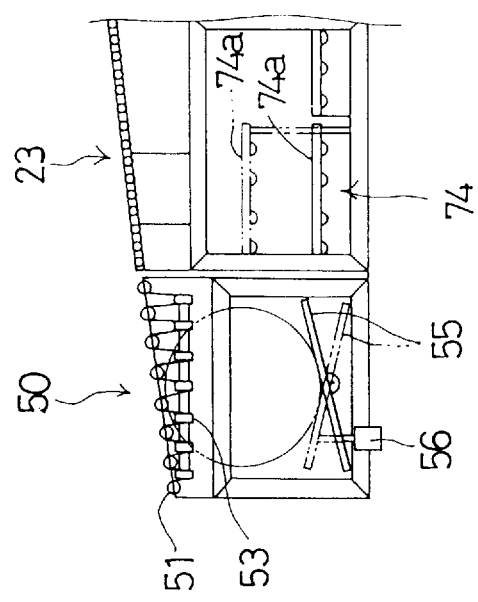
FIG. 14 is a detailed side view thereof.
Figure 15:
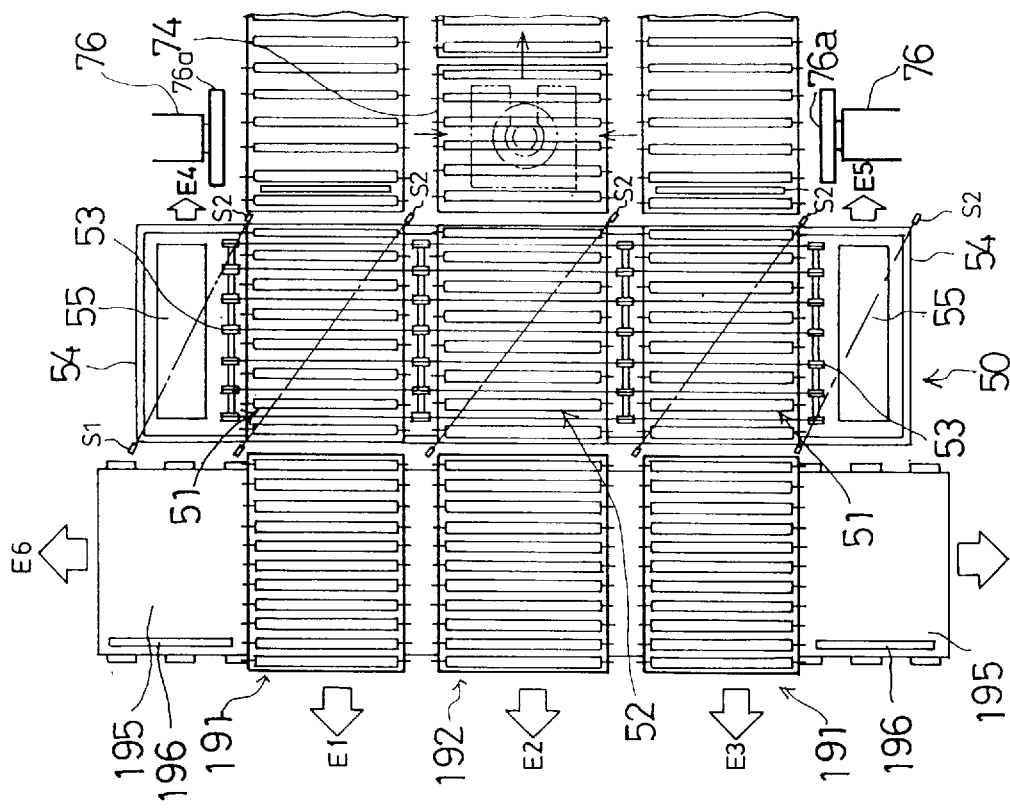
FIG. 15 is a plan view showing a tire transport and classification apparatus according to another embodiment.

FIGS. 14 and 15 are a plan view and a side view showing the distribution conveyor 50 shown in FIGS. 1 and 2 in more detail.

Each roller conveyor 51, 52, 51 has a light sensor comprising a light projector S1 and a light receiver S2 for confirming position of the tire 2. When it is confirmed based on detection of the light sensor that the tire 2 has been moved by the rope conveyor 53 to a required position, the rope conveyor 53 is lowered. The tire 2 is shifted onto any one of the roller conveyors 52, 51 and taken out by a pertinent roller conveyor. Thus, the tires can be classified into three kinds to be taken out through different outlets E1, E2, E3 respectively.

A limit switch can be used in place of the light sensor to confirm position of the tire 2. For example, a moving part of the limit switch may be formed in a swinging bar which is contacted with a tire coming transported, swings to an extent that the transportation of the tire is not prevented, and turns on the switch to detect the tire reaching a predetermined position.

Along right and left take-out ends of the rope conveyor 53 are provided tire shoots 54, 54 respectively. The tire shoot 54 is formed in a square pipe shape having an opening of a flat rectangular shape as viewed from the above so that the tire 2 drops in an upright posture. The tire 2 transported in any direction on the rope conveyor enters the tire shoot 54 from the take-out end in the upright posture and drops keeping the upright posture.

On a bottom of the tire shoot 54 is provided a slanting plate 55 having a middle pivotally supported by a shaft directed in a right and left direction horizontally. The slanting plate 55 is driven by an air cylinder 56 to slant forward and rearward, that is, toward the lower stream side and the upper stream side. If the slanting plate 55 is slanted rearward, the dropped tire 2 rolls rearward on the slanting plate 55 to be taken out through the outlet E4 (E5), and if slanted forward, the tire rolls forward to be taken out through the outlet E6 (E7). Also the tire shoots 54, 54 are each provided with a light sensor comprising a light projector S1 and a light receiver S2 so that passing of the tire 2 can be confirmed.

According to the tire transport and classification apparatus, the tire can be classified into maximally seven kinds by the outlets E1, E2, E3 and further by the outlets E4, E5, E6, E7, with an installation space widened only a little by the widths of the tire shoots 54, 54. That is, a number of kinds of tire in which the tires can be classified can be increased up to twice or more without altering an existing layout, requiring no new large equipment and at low cost.

In the tire uniformity measurement apparatus, periodical inspections of the measurement accuracy are necessary and an inspection tire is used for the inspection. If the inspection tire is taken out through the outlets E4, E5 rearward for returning, repetitive use of the inspection tire is easy and labor can be reduced.

Further, if conveyors parallel with the transfer conveyors 20 are laid from the outlets E4, E5 rearward to the tire discrimination apparatus 11 or the distribution apparatus 12 at the upper stream side, both carry-in and carry-out of the inspection tire can be full automated.

Figure 16:
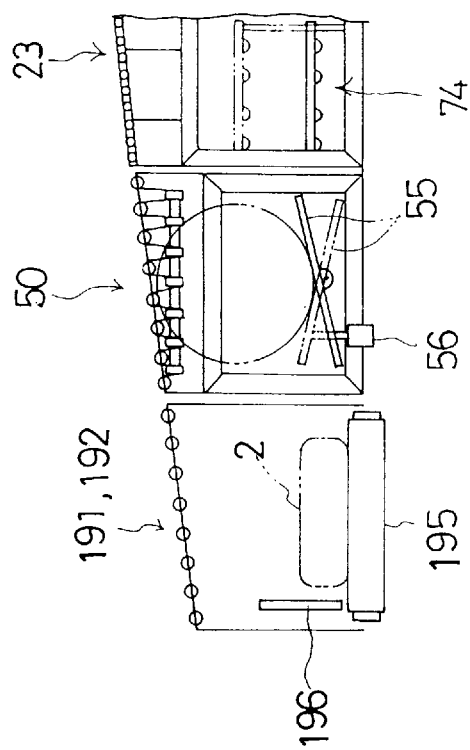
FIG. 16 is a side view thereof.

FIGS. 15 and 16 show another embodiment of the tire transport and classification apparatus. In this embodiment, a further classification means is added to the above-mentioned tire transport and classification apparatus of the tire uniformity measurement and correction apparatus 1. FIGS. 15 and 16 show a lower stream side of the transfer conveyor 20 including the transport blocks 23 and the upper stream side is the same as the aforementioned embodiment.

At the lower stream side of and continuing to the aforesaid roller conveyors 51, 52, 51 are laid roller conveyors 191, 192, 191 at the same inclination angles as those of the roller conveyors 51, 52, 51. By making use of any one of the roller conveyors 51, 52, 51 for transportation, the tires 2 can be classified into three kinds and taken out through the outlets E1, E2, E3 respectively.

Under the roller conveyors 191, 192, 191 is laid a belt conveyor 195 which is a right-and-left transport conveyor directed in a right and left direction. The tire 2 rolled forward by the slanting plate 55 on the bottom of the tire shoot 54 of the distribution conveyor 50 moves on the belt conveyor 195. The tire is stopped by a stopper in front, laid down on the belt conveyor 195 and transported toward right or left to be taken out through the outlet E6 or E7.

If the belt conveyor 195 is moving leftward when the tire 2 comes as rolling on the conveyor 195, the tire 2 is laid down rightward. Conversely, if the belt conveyor 195 is moving rightward at that time, the tire 2 is laid down leftward. Therefore, it is possible to select two cases that either of an obverse side or a reverse side of the tire faces upward. The obverse side is defined as the side on which a serial number is indicated.

That is, when the tire 2 comes as rolling on the belt conveyor 195, the belt conveyor 195 is moved rightward or leftward temporarily regardless of a final transporting direction of the tire by the belt conveyor 195 to lay down the tire to a desired direction so that the obverse side or the reverse side of the tire faces upward, and then the belt conveyor 195 is driven to the final transporting direction.

In this manner, the all tires taken out through the outlets E6 and E7 can be further classified by whether the upper face is the obverse side or the reverse side. Namely, tires can be taken out from the belt conveyor 195 classified into four kinds.

The present transport and classification apparatus can classify the tires into nine kinds in all, five kinds from the outlets E1, E2, E3, E4, E5 and four kinds from the outlets E6, E7.

Thus, by only additionally arranging the roller conveyors 191, 192, 191 and the belt conveyor 195 up and down at a lower stream side of the roller conveyors 51, 52, 51, the number of kinds into which the tire can be classified is increased without widening the installation space so much.

If there is an enough space, conveyors driven back and forth may be arranged under the take-out ends of the roller conveyors 191, 192, 191 respectively. These conveyors transport the tires forward finally but can lay down the tires selectively in two states with the obverse or reverse side faced upward similarly to the above-mentioned belt conveyor 195 so that the tires are further classified into two kinds at the three outlets respectively. Such conveyors may be provided under the roller conveyors 51, 52, 51 in place of the roller conveyors 191, 192, 191 and the belt conveyor 195, or applied to other places.

The tire uniformity measurement and correction apparatus 1 having the entire rough construction as described above is further provided with a rim exchange apparatus 60 for exchanging the rims 3, 4 automatically.

The space between the right and left transfer conveyors 20, 20 is utilized for the rim exchange apparatus 60 and in the space between the centering blocks 21, 21 is arranged an up-and-down rim storage shelf 61.

Figure 7:
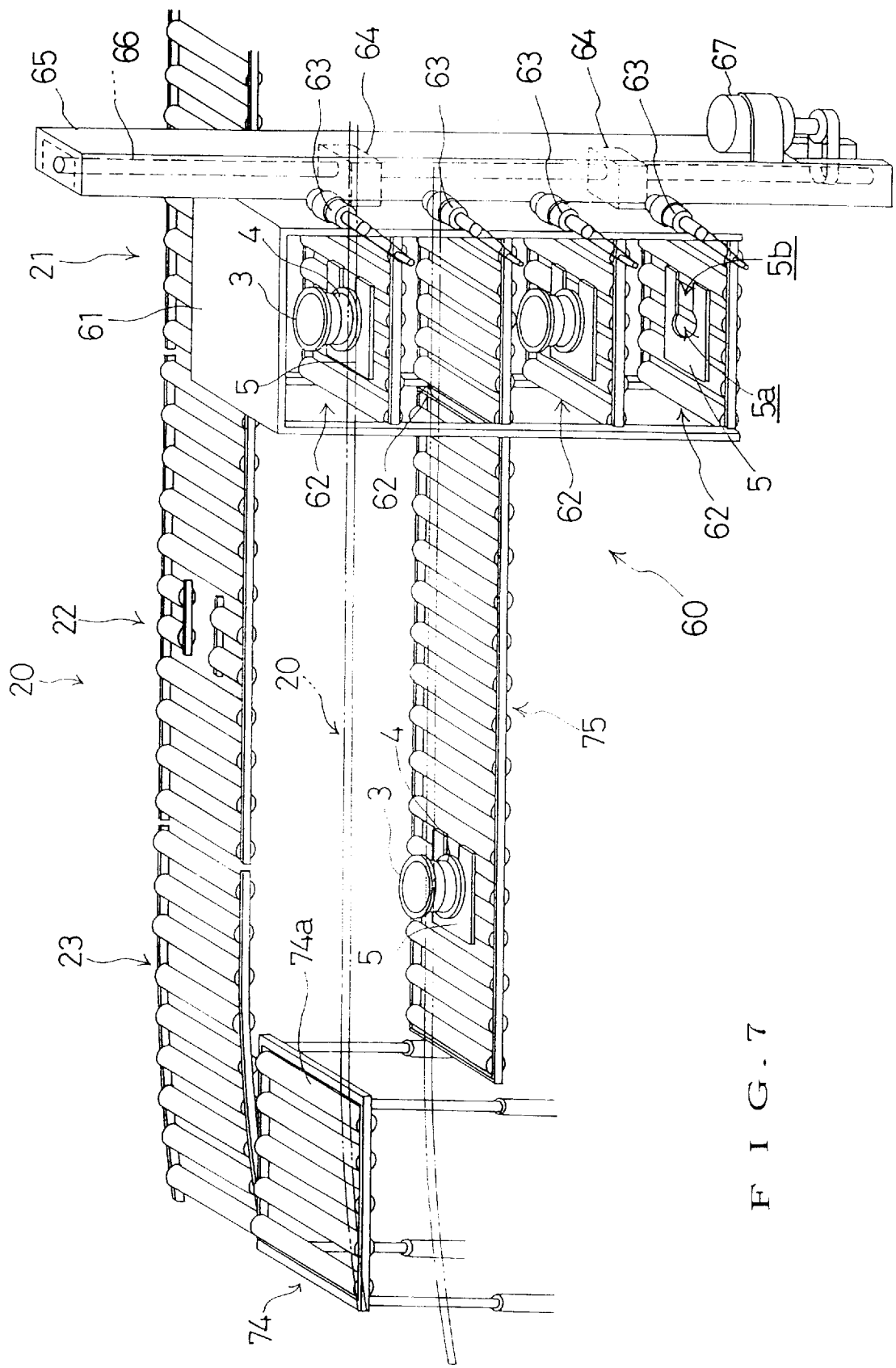
FIG. 7 is a partly omitted perspective view of an essential part of a rim exchange apparatus.

As shown in FIG. 7, the up-and-down rim storage shelf 61 is a vertically long box with openings on the front, right and left sides. Within the shelf 61 are formed four stairs by mount conveyors 62 each having rollers turned by a motor 63 through a belt at equal speeds.

On a back plate of the up-and-down rim storage shelf 61 is projected a slider 64 which is slidably fitted to an upright supporting rail 65 for supporting the shelf 61 so as to go up and down. Within the supporting rail 65, a screw shaft 66 extends vertically and passes through and engages with the slider 64.

The screw shaft 66 is rotated by a motor 67 fixed to a lower end of the supporting rail 65 through a timing belt 68 and the up-and-down rim storage shelf 61 goes up and down in accordance with the rotation of the screw shaft 66 through the slider 64.

The upper and lower rims 3, 4 are conveyed and placed on the mount conveyor 62 of the up-and-down rim storage shelf 61 in a state that they are placed on a pallet 5 one above another. As shown in FIG. 7, the pallet 5 is made in a rectangular plate shape and has a central circular hole 5a and a cut 5b reaching the circular hole 5a from a side of the pallet. The circular hole 5a has a diameter smaller than an outer diameter of the lower rim 4 but larger than an outer diameter of the lower rim shaft 26. An empty pallet 5 without upper and lower rims 3, 4 thereon is also placed on the mount conveyor 62, as shown in FIG. 7.

Up-and-down motion of the up-and-down rim storage shelf 61 can be controlled so that the mount conveyor 62 is set at the same height as rollers of the centering block 21.

On an outer side of the centering block 21 is arranged a shifting apparatus 70 (FIG. 1) which comprises a cylinder 71 and a pinching arm 72 provided on a tip end of a piston rod of the cylinder 71.

The piston rod of the shifting apparatus 70 is protruded from the cylinder 71 for approaching the upper and lower rims 3, 4 placed on the mount conveyor 62 of the up-and-down rim storage shelf 61 positioned at the same height as the rollers of the centering block 21, and the pinching arm 72 pinches the pallet 5 on which the rims 3, 4 are placed. Then the piston rod is retracted to draw the pallet onto the rollers of the centering block 21.

On the one hand, between the transport blocks 23, 23 of the right and left transfer conveyors 20, 20 is arranged a table lifter 74 having an up-and-down table 74a formed by a roller conveyor. A predetermined upper position of the table 74a is somewhat lower than the rollers of the transport block 23.

Between the table lifter 74 and the up-and-down rim storage shelf 61 is arranged a rim transport conveyor 75 composed of a roller conveyor. The conveyor 75 is arranged in a position lower than the right and left transfer conveyors 20, 20 and has rollers turned by a motor 75a (FIG. 2) at equal speeds.

A predetermined lower position of the table 74a of the table lifter 74 is the same height as the rim transport conveyor 75.

On an outside of the transport block 23 of the transfer conveyor 20 is arranged a shifting cylinder 76 having a piston rod directing inward. A pressing bar 76a is formed at a tip end of the piston rod.

The pallet 5 on rollers of the transport block 23 with or without the upper and lower rims 3, 4 is pressed by the pressing bar 76a of the extruded piston rod of the shifting cylinder 76 to be shifted onto the table 74a of the table lifter raised to the predetermined upper position.

The present tire uniformity measurement and correction apparatus 1 has the aforementioned rim exchange apparatus 60.

Hereinafter, operation procedure of the tire uniformity measurement and correction apparatus 1 and the rim exchange apparatus 60 will be described.

At first, specific upper and lower rims 3, 4 are fitted to the upper and lower rim shaft 25, 26 at each of the right and left measurement blocks 22, 22 and other upper and lower rims 3, 4 of different sizes are stored in the up-and-down rim storage shelf 61 being placed on the pallets 5. In the shelf 61 is stored an empty pallet 5, too.

The tire 2 brought in from the stock conveyor 10 is firstly discriminated by reading the bar code and applied with a diluted silicone on a bead section at the tire discrimination apparatus 11, then moved to the distribution apparatus where tires which cannot be discriminated or have a size deviated from a predetermined size are let fall forward for ejecting and other tires are distributed rightward or leftward in accordance with the discriminated sizes.

When tires of the same kind are measured uniformity at the right and left measurement blocks, tires to be transferred are distributed rightward or leftward in turn alternately.

The distributed tire 2 changes its course by means of the curved roller conveyor 14 and comes to the centering block 21 of the transfer conveyor 20 where the tire 2 is centered by the pair of right and left centering arms and transferred to the measurement block 22 at a predetermined timing by the stopper 21b.

At the measurement block 22, the tire 2 is positioned by the front, rear, right and left positioning arms 22a, then the lower rim shaft 26 positioned below rises to support and raise the bead section of the tire 2 by the lower rim 4 fitted to an upper end of the rim shaft 26. The upper rim fitted to the upper rim shaft 25 awaiting at the upper part receives the bead section of the tire 2, the upper and lower rims are engaged with each other, thus the tire 2 is held at a predetermined height (the same height as the rotary drum 42). Then, air is supplied within the tire to maintain a predetermined inner pressure.

The rotary drum 42 is moved by the hydraulic cylinder 43 and pressed against the tire 2 at a predetermined pressure. The upper rim shaft 25 is rotated by the servomotor 31 to rotate the tire 2, thereby the rotary drum 42 rotates together with the tire 2. After several aging rotations, uniformity measurements are carried out while rotating the tire reversely then normally.

The uniformity measurement is carried out over the entire circumference of the tire by detection of the load cell 45. The result of the detection of the load cell 45 is processed by a computer to calculate uniformity measurement values and the tire is assessed by the uniformity measurement values such as RFV and LFV.

When a uniformity measurement is carried out on one measurement block 22, a tire attachment work by the upper and lower rims 3, 4 is carried out on another measurement block 22, so that a good working efficiency is attainable.

When it is judged that a correction is necessary as a result of the uniformity measurement, a uniformity correction by the grinder mechanism 32 is commenced while the rotary drum 42 is moved to another measurement block 22. However, working procedure in the case that the uniformity correction is necessary will be described later and firstly the description will be made regarding a case that no uniformity correction is required.

On a spot of the tire where the maximum value of RFV is shown in the uniformity measurement, a mark is put by the marking apparatus 27.

To enable the marking apparatus 27 to put the mark on the specified position, the servomotor 31 drives the tire 2 so that the rotation of the tire is stopped when the spot of the tire showing the maximum value of RFV reaches a predetermined position (most lower stream side, for example).

When the measurement comes to an end, the rotary drum 42 returns to the former position, the inner pressure of the tire 2 is reduced, the lower rim shaft 26 is lowered to put the tire 2 on the rollers of the measurement block 22 and the tire 2 is transferred to the transport block 23.

The tire 2 advances on the rollers of the transport block 23 to the distribution conveyor 50 where the tire 2 is distributed and discharged to any one of the five discharge places in accordance with the assessment of the tire by the uniformity measurement.

The single rotary drum 42 is common to both the right and left measurement blocks 22, 22 of the two lines of transfer conveyors 20, 20, and while the measurement is carried out using the rotary drum 42 on one measurement block 22, the tire 2 on another measurement block 22 can be attached to or detached from the upper and lower rims 3, 4, therefore, the uniformity measurement work can be carried out efficiently.

If sizes of the upper and lower rims 3, 4 at the right measurement block 22 is different from those of the left measurement block 22, two kinds of tires can be measured at the same time.

Rim exchange work is carried out as follows. At first, an empty pallet 5 stored in the up-and-down rim storage shelf 61 is transferred onto the rollers of the centering block 21 from a mount conveyor positioned at the same height as the transfer conveyor 20 by the shifting apparatus 71 and transferred to the measurement block 22 after centering.

On the measurement block 22, the pallet 5 once goes beyond the central part and stops there. In this state, the lower rim shaft 28 is raised to engage the lower rim 4 with the upper rim 3 and the upper rim 3 is detached from the upper rim shaft 25 to support the upper rim 3 by the lower rim 4.

In the meantime, the rollers of the measurement block 22 is turned reversely to return the pallet 5 stopped on the lower stream side to the center.

The pallet 5 having the cut 5b at the upper stream side is returned to a position where the lower rim shaft 25 passes through the central circular hole 5a and stopped there. Then the lower rim shaft 26 is lowered until the lower rim 4 is placed on the pallet 5 and the lower rim is detached from the lower rim shaft 26.

The upper and lower rims 3, 4 thus placed on the pallet 5 are transferred to the next transport block 23, and stopped at a predetermined position by the stopper 23a projected. Then the pallet 5 is pressed inwardly by the shifting cylinder 76 arranged on a lateral and shifted onto the table 74a of the table lifter 74 awaiting at the same height.

Next, the table 74a is lowered to the same height as the rim transport conveyor 75 and the upper and lower rims 3, 4 as well as the pallet 5 are shifted to the rim transport conveyor 75 to be transported to the up-and-down rim storage shelf 61.

Regarding the up-and-down rim storage shelf 61, an empty mount conveyor 26 of a predetermined stair is set at the same height as the rim transport conveyor 75, so that the upper and lower rims 3, 4 as well as the pallet 5 can be stored on the mount conveyor 62.

At a timing somewhat delayed from the aforementioned works for removing and recovering used upper and lower rims 3, 4 are carried out works for supplying and attaching new upper and lower rims 3, 4.

That is, at a suitable time after the empty pallet 5 has been taken out from the up-and-down rim storage shelf 61, new upper and lower rims 3, 4 stored in the up-and-down rim storage shelf 61 are shifted to the transfer conveyor 20 by the shifting apparatus 70 together with the pallet 5 and transferred to the measurement block 22 after the used upper and lower rims have been removed.

On the measurement block 22, the new upper and lower rims 3, 4 and the pallet 5 are positioned at the center and the lower rim shaft 26 is raised. The lower rim shaft 26 passes through the circular hole 5a of the pallet 5 to be fitted with and support the lower rim 4. The lower rim 4 and the upper rim 3 piled on the lower rim 4 go up together with the lower rim shaft 26 and the upper rim 3 comes into contact with the upper rim shaft 25 and fitted to the upper rim shaft.

In the meantime, the pallet 5 left on the rollers is transferred to the transport block 23. Though the lower rim shaft 26 penetrates the circular hole 5a of the pallet 5, the lower rim shaft 26 can be disengaged from the pallet 5 passing through the cut 5b extending toward the upper stream side when the pallet 5 moves to the lower stream side, therefore the pallet 5 can move toward the lower stream side without any trouble.

After the pallet 5 has moved to the transport block 23, the lower rim shaft 26 is lowered, thereby the upper rim 3 remains above in the state fitted to the upper rim shaft 25 and the lower rim 4 fitted to the lower rim shaft 26 is positioned under the rollers for awaiting the tire to be attached.

The empty pallet 5 transferred to the transport block 23 is shifted to the table 74a of the table lifter 74 by the shifting apparatus 76. Thereafter, the table 74a is lowered and the pallet 5 is transferred from the lowered table 74a to the rim transport conveyor 75. The pallet 5 is transported by the transport conveyor 75 and received on the mount conveyor 62 of the up-and-down rim storage shelf 61 set at a predetermined height.

The aforementioned works for removing and recovering the used upper and lower rims 3, 4 and works for supplying and attaching the new upper and lower rims 3, 4 can be performed full automatically, efficiently and smoothly.

Now, the working procedure in case that the uniformity correction is necessary will be described referring to a timing chart of FIG. 8 as one example.

The first tire 2 is brought onto the measurement block 22 of the transfer conveyor 20 of left side line and held by the upper and lower rims 3, 4. The rotary drum 42 is moved to the left side and the uniformity measurement is carried out at the measurement block 22 of the left side line.

In the meantime, at the measurement block 22 of the right side line, the second tire 2 is set to the upper and lower rims 3, 4. The rotary drum 42 moves to the right side line at a predetermined timing irrespective of whether a correction is necessary or not as the result of the uniformity measurement regarding the first tire 2.

Figure 8:
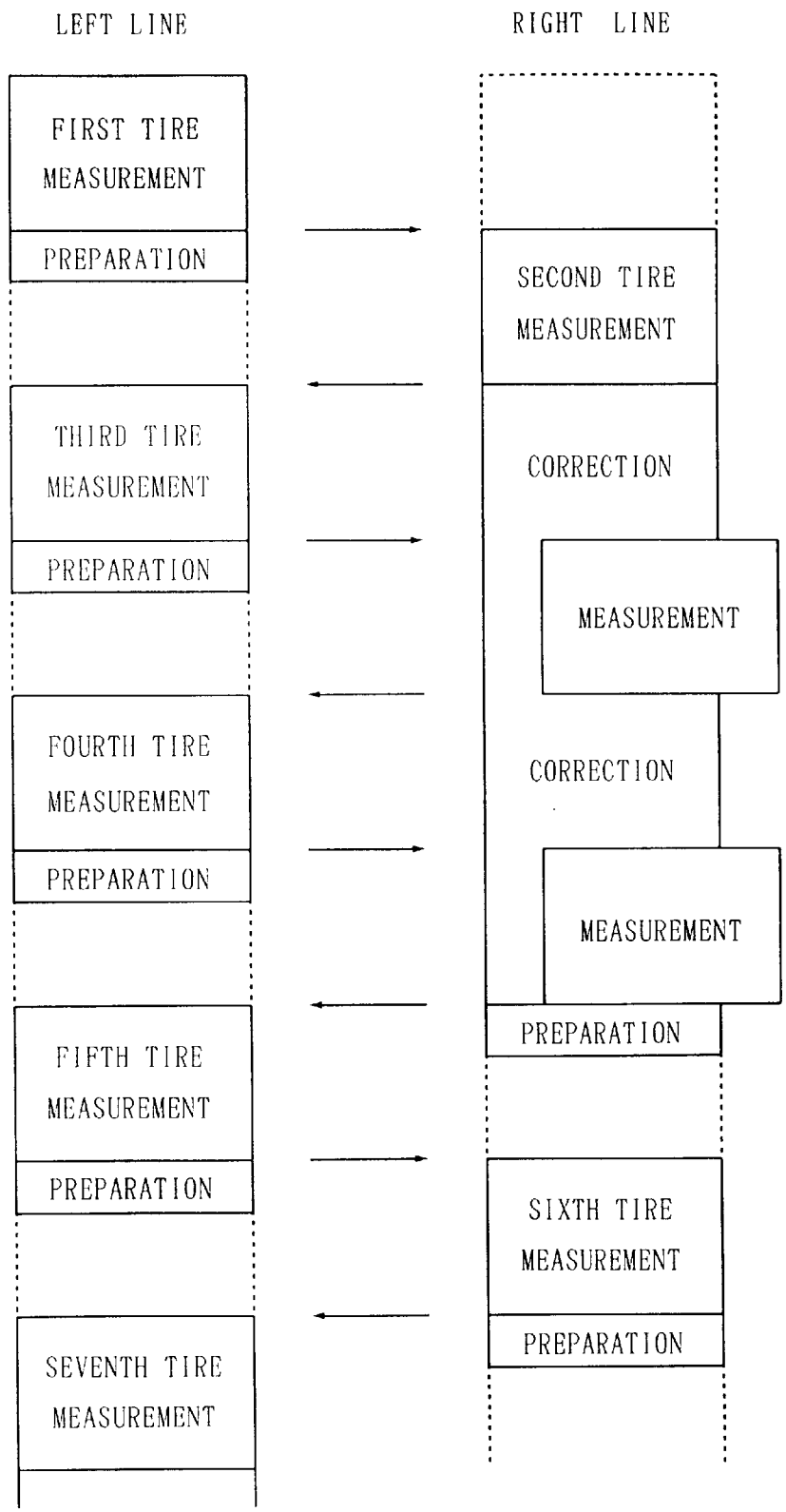
FIG. 8 is an illustration for showing a timing chart of the tire uniformity measurements and corrections.

The timing chart of FIG. 8 shows a case when it is judged that the correction of the first tire 2 is unnecessary. At the right side line, a uniformity measurement is carried out about the second tire 2, and at the left side line, preparation for measurement of the next tire is commenced.

After the measurement of the second tire is finished, the rotary drum 42 moves to the left side line at the predetermined timing and the uniformity measurement of the third tire 2 already set to the upper and lower rims 3, 4 is commenced.

With regard to the second tire 2, it is judged that a correction is necessary as the result of the measurement and the grinder 32 of the right side line operates after the rotary drum 42 moves to the left side.

Namely, with regard to the second tire 2, a spot to be cut is specified as the result of the uniformity measurement, and the grinder 37 is positioned in accordance with the specified spot and applied to the tire 2 rotated by the servomotor 31 at a required speed to cut the tire for uniformity correction.

During the uniformity correction is carried out at the right side line, a uniformity measurement of the third tire 2 is carried out by the rotary drum 42 at the left side line.

After completion of the uniformity measurement of the third tire 2, the rotary drum 42 moves to the right side line at the predetermined timing and a measurement is carried out about the second tire 2 in order to confirm effect of the uniformity correction.

After this measurement, the rotary drum 42 moves to the left side line at the predetermined timing and carries out a uniformity measurement about the fourth tire 2, while another uniformity correction based on the result of the second measurement is carried out at the right side line.

When it is judged that no correction is required as the result of the second measurement, the measurement about the second tire 2 comes to an end, the tire is disengaged from the upper and lower rims 3, 4 for transportation and supply of the fifth tire 2 is awaited.

In case of the timing chart of FIG. 8, while a measurement is carried out about the fourth tire 2 at the left side line, a second correction about the second tire 2 is carried out and the rotary drum 42 reaching the right side line after the measurement of the fourth tire 2 carries out a measurement for confirming effect of the second correction, therefore the fifth tire 2 is supplied to the left side line.

Since the rotary drum 42 reciprocates between the right and left lines at a predetermined timing for carrying out the uniformity measurement alternately regardless whether the uniformity correction is necessary or not, even if a uniformity correction is required on one line, uniformity measurements on another line are carried out at an ordinary pace without loss time. Therefore, the uniformity measuring and correcting works can be performed efficiently without being stagnant.

The result of the uniformity correction can be measured by the rotary drum 42 when it returns to the corresponding line.

As described above, respective uniformity measurements at both right and left transfer conveyors 20 can be carried out by a single rotary drum 42 efficiently and installation cost can be reduced.

In the present embodiment, respective independent motors 31 are used for rotating the tire 2 held by the upper and lower rims 3, 4. However, a single motor may be used if two pulleys for driving the respective rim shafts by means of belts are connected to a drive shaft of the motor through clutches respectively. By controlling the clutches, the tires of the right and left lines can be driven by the motor independently from each other.

Figure 12:
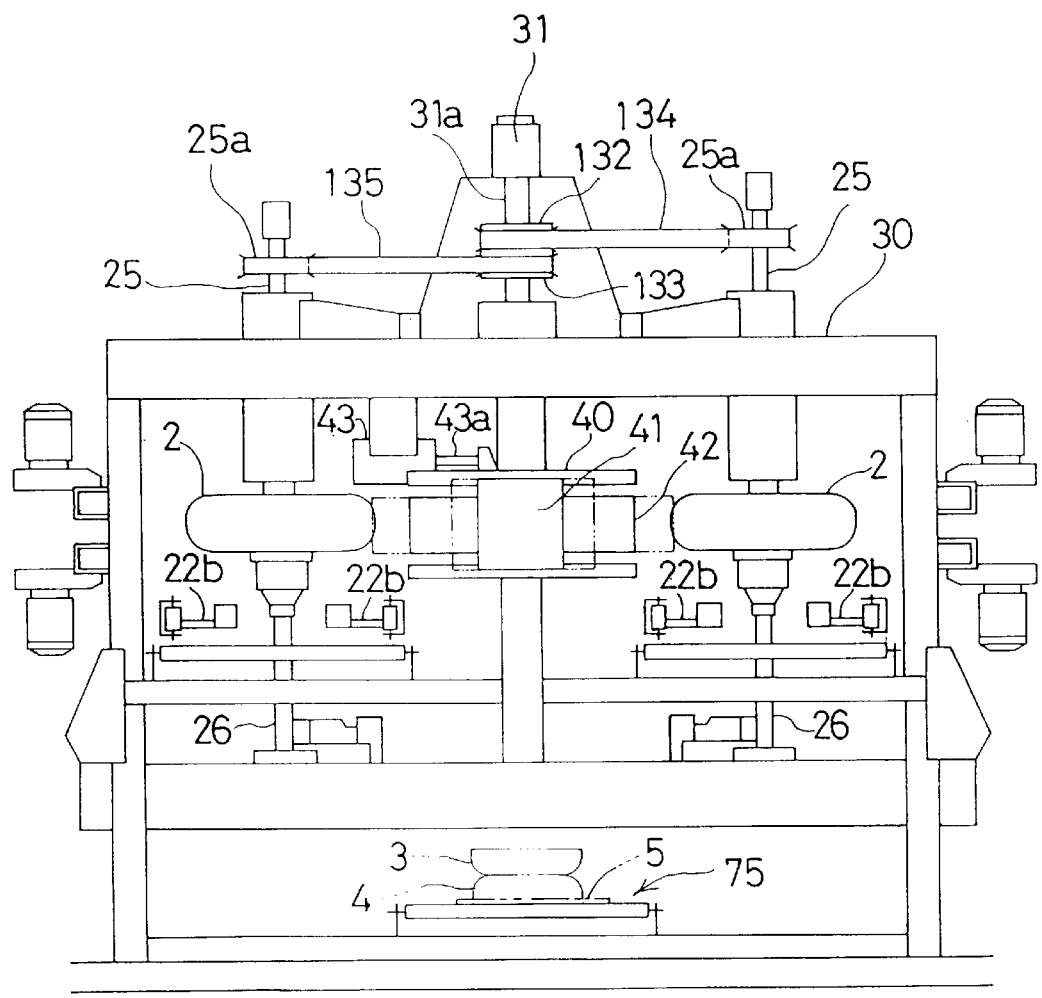
FIG. 12 is a front view similar to FIG. 3 showing a tire rotating mechanism according to another embodiment.
Figure 13:
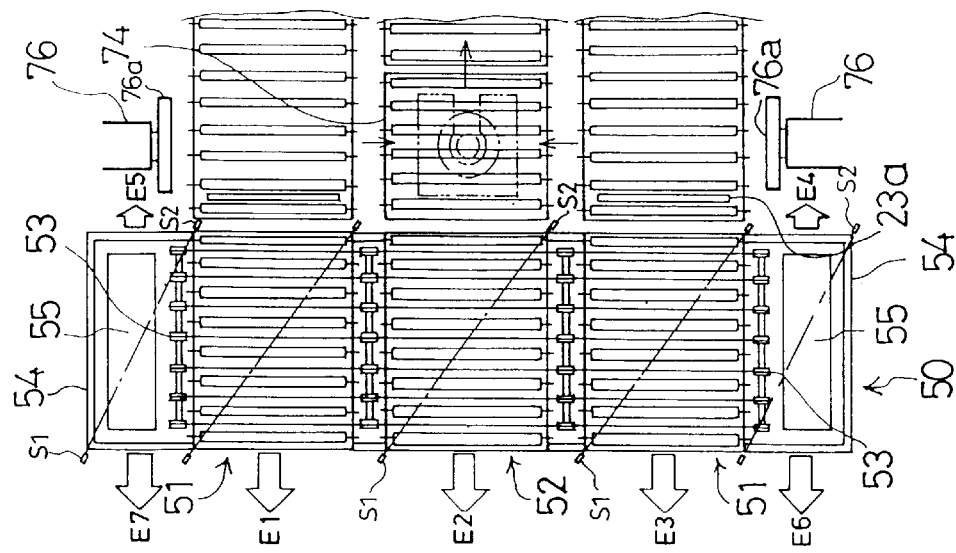
FIG. 13 a detailed plan view of a tire transport and classification apparatus.

FIG. 12 shows an example thereof. A servomotor 31 is fixedly supported by a bracket projected at a middle in right and left direction of the supporting frame 30. On a drive shaft 31a projected downward of the servomotor 31 are attached upper and lower drive pulleys 132, 133 each through a clutch. A timing belt 134 is wound round the upper pulley 132 and a driven pulley 25a of the aforementioned left side measurement block 22 (right side in FIG. 12) and another timing belt 135 is wound round the lower drive pulley 133 and a driven pulley 25a of the aforementioned right side measurement block 22.

Therefore, the right and left upper rim shafts 25 can be rotated by the servomotor 31 through the timing belts 134, 135 respectively, and it is possible to drive only one timing belt for rotating the right or left upper rim shaft selectively by engaging or disengaging the clutches suitably.

Figure 9:
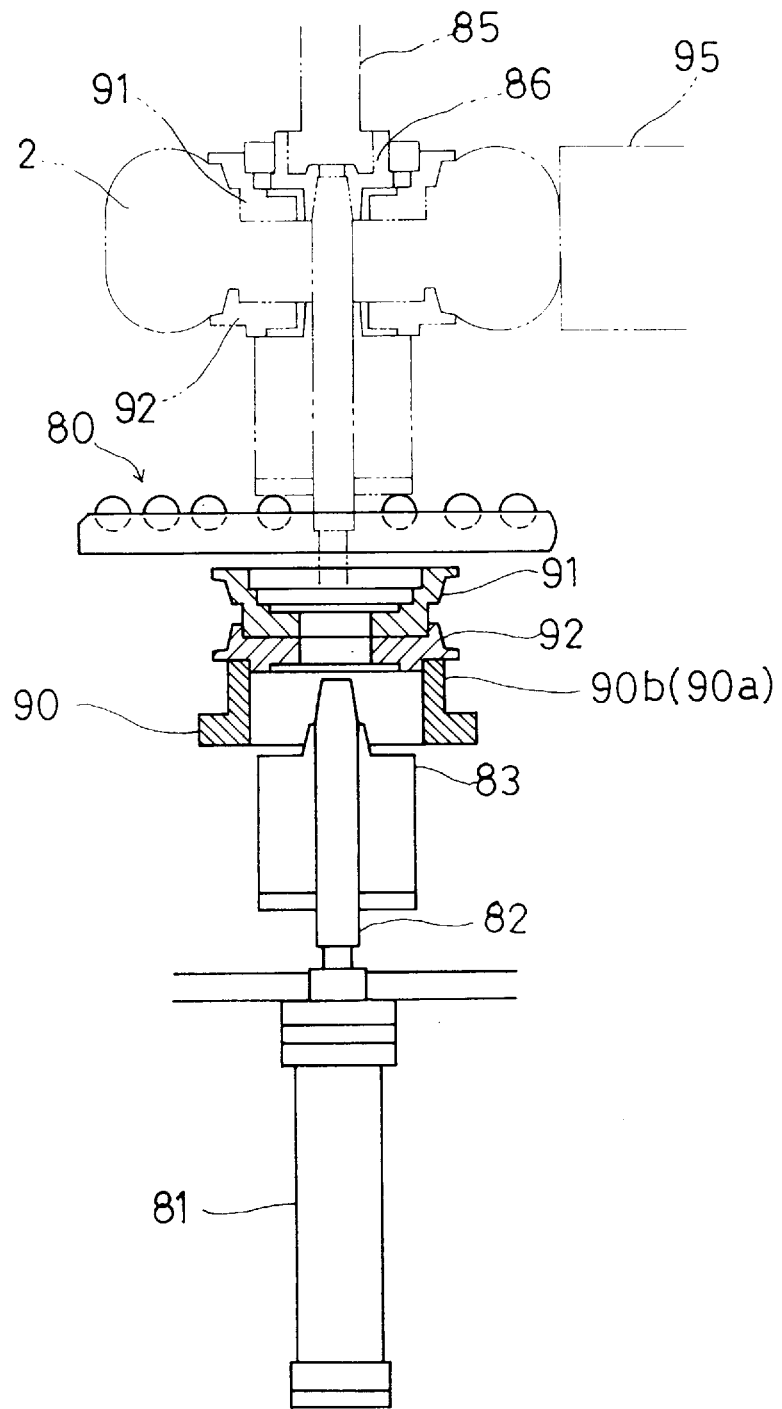
FIG. 9 is a sectional view of a rim exchange apparatus according to another embodiment.
Figure 10:
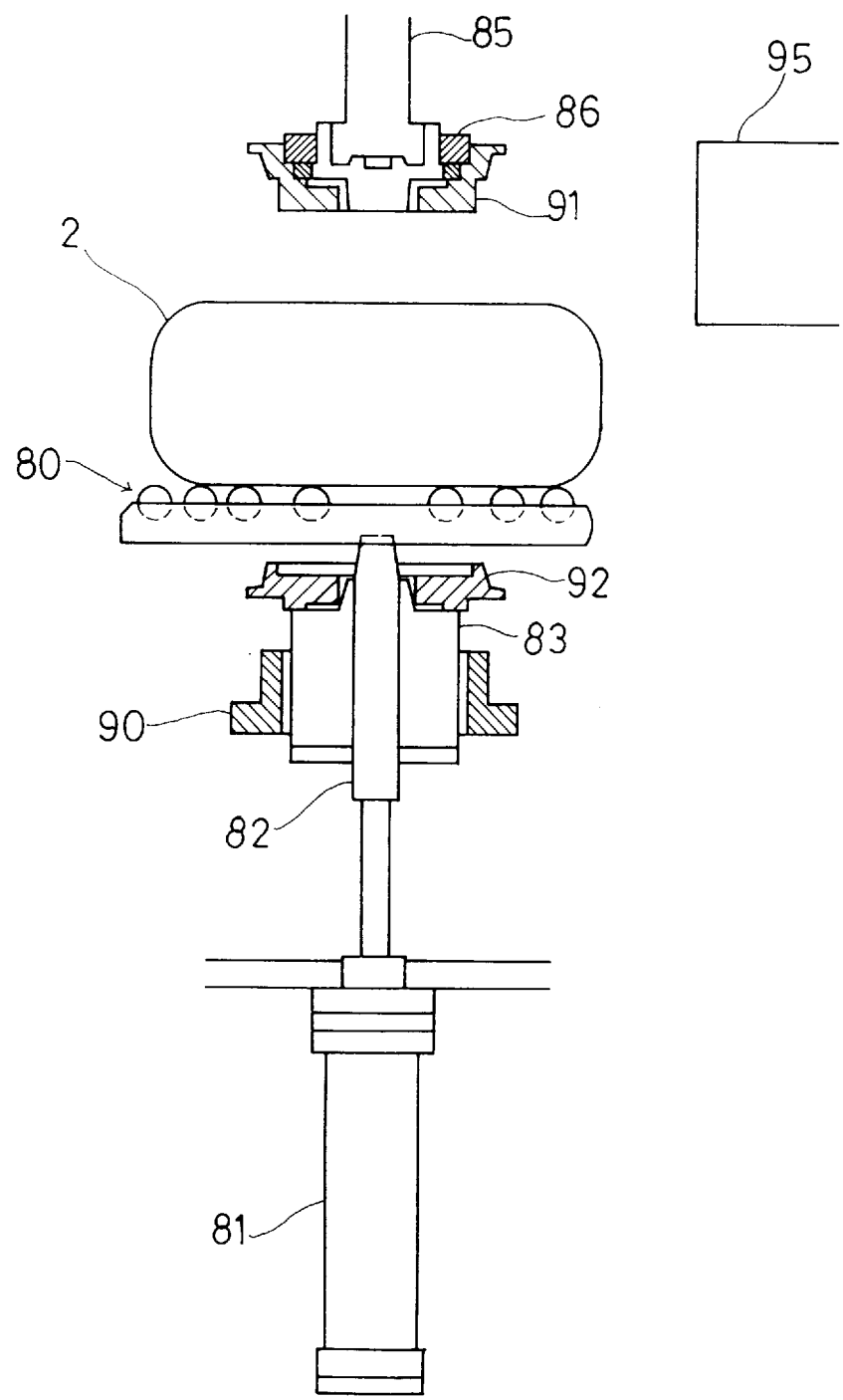
FIG. 10 is a sectional view of the rim exchange apparatus showing another state thereof.
Figure 11:
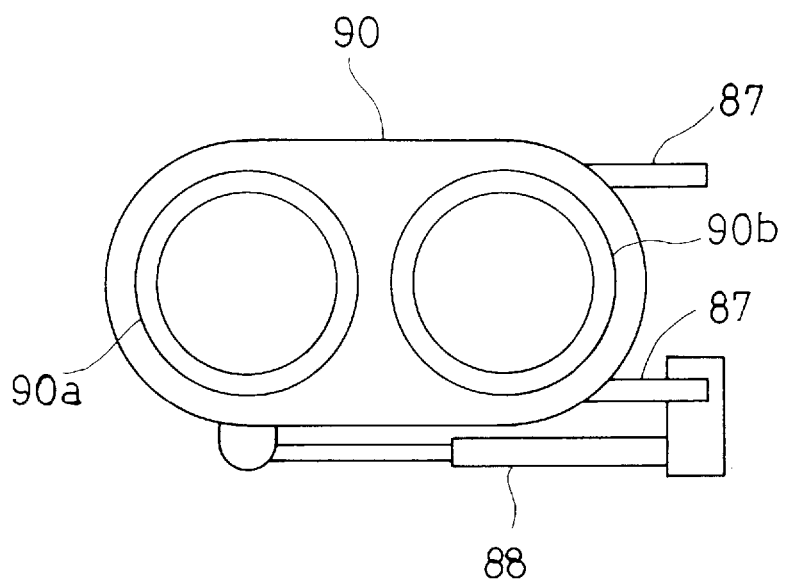
FIG. 11 is a plan view of a rim shifting plate.

FIGS. 9 to 11 show a more simplified modification of the rim exchange apparatus 60 in the aforementioned embodiment.

At a measurement block of a transfer conveyor 80, under a central opening formed by short rollers divided into right and left is arranged a lower rim shaft 82 which goes up and down by a rim elevator cylinder 81 and has a lower rim mount 83 at the upper end, and above the lower rim shaft and opposite thereto is hung a upper rim shaft 85 which has a upper rim mount 86 with a magnet at the lower end.

Along a lower surface of the transfer conveyor 80 is supported a rim shifting plate 90 movably back and forth guided by guide rails 87 as shown in FIG. 11. The rim shifting plate 90 is driven by a cylinder 88 to move back and forth.

The rim shifting plate 90 is a plate member of an elliptical plan view having front and rear flat cylindrical sections 90a, 90b projecting upward to form circular openings.

The front and rear cylindrical sections 90a, 90b of the rim shifting plate 90 support different kinds of rims respectively in a state that the upper and lower rims 91, 92 are piled up.

When the shifting plate 90 is positioned in front, the center axis of the rear cylindrical section 90b is aligned with axes of the upper and lower rim shafts 82, 85, and at a rear position of the shifting plate 90, the center axis of the front cylindrical section 90a is aligned with the axes of the upper and lower rim shafts 82, 85.

As shown in FIG. 9, under the transfer conveyor 80, upper and lower rims 91, 92 are piled up and supported on each of the front and rear cylindrical sections 90a, 90b of the rim shifting plate 90. Which pair of rims 91, 92 between those pairs supported on the front and rear cylindrical sections 90a, 90b is to be used can be selected by driving the rim shifting plate with the cylinder 88.

When a pair of rims 91, 92 is selected and the lower rim mount 83 is raised by driving of the rim elevator cylinder 81, the lower rim mount 83 passes through the cylindrical section 90a or 90b to support the selected rims 91, 92 from the bottom and let go up together.

When the upper rim 91 is brought into contact with the upper rim mount 86, the magnet is excited to attract the upper rim 91 to the upper rim mount 86, then the lower rim mount 83 is lowered together with the lower rim 92 which separates from the upper rim 91 remaining above, and as the result, the upper and lower rims 91, 92 are positioned on the upper and lower sides putting the transfer conveyor 80 therebetween. In this state, the tire 2 conveyed by the transfer conveyor 80 is positioned and stops between the upper and lower rims 91, 92 as shown in FIG. 10.

When the lower rim mount 83 goes up from the state of FIG. 10, the lower rim mount 83 supports and raises the tire 2 through the lower rim 92 and the tire 2 is pressed against the upper rim 91 positioned above attracted to the upper rim mount 86. Thus the tire 2 is supported at a predetermined height pinched between the upper and lower rims 91, 92 as shown in FIG. 9 by the dot-dash line.

In this state, the tire 2 is driven by means of the upper rim shaft 85 to rotate, thereby the uniformity measurement is carried out by the rotary drum 95 pressed against the tire from a lateral side and the uniformity correction by the grinder.

When the measurement and correction is over, the lower rim mount 83 is lowered, thereby the tire is lowered together and placed on the transfer conveyor 80 halfway. The lower rim mount 83 separates from the tire to go down further. After that, the tire 2 is conveyed toward the lower stream side by the transfer conveyor 80.

For the rim exchange, the lower rim mount 83 supporting the lower rim 92 is raised to go to meet the upper rim 91 and when the upper and lower rims 91, 92 are contacted with each other, the magnet of the upper rim mount 86 is demagnetized so that the upper rim 91 is supported by the lower rim 92 and lowered together with the lower rim 92. After returned to the state shown in FIG. 9 by the solid line, the rim shifting plate 90 is moved in front and rear direction to exchange for another kind of rim.

If the rim shifting plate is made longer and the number of cylindrical sections is increased, three or more kinds of rims can be exchanged.

What is claimed is:

1. An apparatus for measuring and correcting uniformity of tires, comprising:

right and left transfer conveyors arranged in two parallel files for transferring tires;

rim shafts provided at each corresponding middle position of said right and left transfer conveyors for supporting and rotating said tire by upper and lower rims;

a rotary drum arranged between said right and left rim shafts, capable of moving in a right and left direction to be pressed against said tire supported by one of said rim shafts for detecting load conditions while rotating together with said tire;

grinder mechanisms provided on each of said right and left transfer conveyors at a position opposite to said rotary drum with respect to said transfer conveyor; and control means for controlling uniformity measurement by said rotary drum and uniformity correction by said grinder mechanism, so that when the uniformity correction of a tire supported by one of said rim shafts is carried out, the uniformity measurement of another tire supported by another rim shaft is carried out.

2. An apparatus for measuring and correcting uniformity of tires as claimed in claim 1, wherein said control means controls so that said rotary drum reciprocates between said two files of transfer conveyors at a constant timing for carrying out the uniformity measurements on both transfer conveyors alternately, regardless whether the uniformity correction is necessary or not.

3. An apparatus for measuring and correcting uniformity of tires as claimed in claim 1, comprising discrimination means for discriminating tires brought in, and distribution means for distributing said discriminated tires to any one of said right and left transfer conveyors or another place.

4. An apparatus for measuring and correcting uniformity of tires as claimed in claim 1, wherein said right and left rim shafts are driven by a motor through respective belt transmission means having clutch mechanisms.

5. An apparatus for measuring and correcting uniformity of tires as claimed in claim 1, wherein said rotary drum is pivotally supported by a rectangular frame body having upper, lower, front and rear walls to form openings on right and left sides, through a load cell, partly protruding out of said right and left openings.

6. An apparatus for measuring and correcting uniformity of tires as claimed in claim 1, having a rim exchange apparatus comprising:

an up-and-down rim storage shelf arranged at an upper stream side of and along said transfer conveyor, having shelf stairs for storing respective pairs of upper and lower rims;

a table lifter arranged at an lower stream side of and along said transfer conveyor;

a rim transport means arranged between said up-and-down rim storage shelf and said table lifter;

an upper stream side shifting means for shifting said pair of upper and lower rims from said up-and-down rim storage shelf to said transfer conveyor; and a lower stream side shifting means for shifting said pair of upper and lower rims from said transfer conveyor to said table lifter.

7. An apparatus for measuring and correcting uniformity of tires as claimed in claim 6, wherein said rim exchange apparatus is arranged between said right and left transfer conveyors to be used in common to said both transfer conveyors.

8. An apparatus for measuring and correcting uniformity of tires as claimed in claim 1, having a tire transport and classification apparatus comprising:

right and left forward transport conveyors arranged on extensions of said right and left transfer conveyors for transporting tires after uniformity measurement forward;

at least one intermediate forward transport conveyor arranged between said right and left forward transport conveyors for transporting said tires forward;

a right-and-left transport conveyor arranged at right angles to said forward transport conveyors for transporting said tires right and left; and forward-and-rearward distribution means arranged at right and left take-out ends of said right-and-left transport conveyor respectively for distributing said tires selectively in front and rear.

9. An apparatus for measuring and correcting uniformity of tires as claimed in claim 8, wherein said forward transport conveyors are roller conveyors, and said right-and-left transport conveyor is a rope conveyor having ropes extending in right and left direction between respective rollers of said roller conveyors and capable of rising and falling so as to appear and disappear.

10. An apparatus for measuring and correcting uniformity of tires as claimed in claim 8, wherein each said forward-and-rearward distribution means has a slanting members arranged under said take-out end of said right-and-left transport conveyor capable of slanting forward and rearward to roll said tires forward and rearward selectively.

11. An apparatus for measuring and correcting uniformity of tires as claimed in claim 10, comprising a second right-and-left transport conveyor provided on at least one of front and rear take-out ends of said forward-and-rearward distribution means for transporting said tires in right and left directions selectively.

12. An apparatus for measuring and correcting uniformity of tires as claimed in claim 11, wherein said tire is dropped on said second right-and-left transport conveyor in an upright posture and said conveyor is temporarily driven in a direction regardless of a final transport direction when the tire is dropped for laying down the tire to right or left so that any one of both sides of the tire becomes an upper surface.

* * * * *